United States Patent [19]

Chan

[11] 4,299,050
[45] Nov. 10, 1981

[54] CONSTRUCTION TOY AND CONTAINER

[76] Inventor: Eric P. P. Chan, 506 E. 82nd St., Apt. #13, New York, N.Y. 10028

[21] Appl. No.: 121,150

[22] Filed: Feb. 13, 1980

[51] Int. Cl.³ .......................................... A63H 33/00
[52] U.S. Cl. ......................................... 46/11; 46/29; 220/94 R
[58] Field of Search .................. 46/29, 27, 28, 23, 11, 46/16, 17; 35/18 A; 273/1 R; 220/94 R

[56] References Cited

U.S. PATENT DOCUMENTS

| | | | |
|---|---|---|---|
| 1,281,832 | 10/1918 | Post | 46/29 |
| 3,690,656 | 9/1972 | Hughes et al. | 273/1 R |
| 3,796,004 | 3/1974 | Auerbach | 46/29 |
| 3,805,441 | 4/1974 | Seubert | 46/29 |
| 3,927,489 | 12/1975 | Bernstein | 46/29 |
| 3,998,003 | 12/1976 | Rosenbaum | 46/25 |

FOREIGN PATENT DOCUMENTS

| | | | |
|---|---|---|---|
| 344665 | 3/1960 | Switzerland | 46/29 |
| 6705 | of 1915 | United Kingdom | 46/29 |
| 253188 | 6/1926 | United Kingdom | 46/29 |

Primary Examiner—Gene Mancene
Assistant Examiner—Mickey Yu
Attorney, Agent, or Firm—Harness, Dickey & Pierce

[57] ABSTRACT

A constuction toy comprises a plurality of rods and flexible linking rings. A variety of structural or decorative three-dimensional constructions can be made by interlocking a multiplicity of rods with the flexible linking rings. The rods can be joined at an infinite number of angles with respect to each other. The toy can be stored and carried in a trapezoidal package in which a multiplicity of linking rings form part of the handle.

7 Claims, 5 Drawing Figures

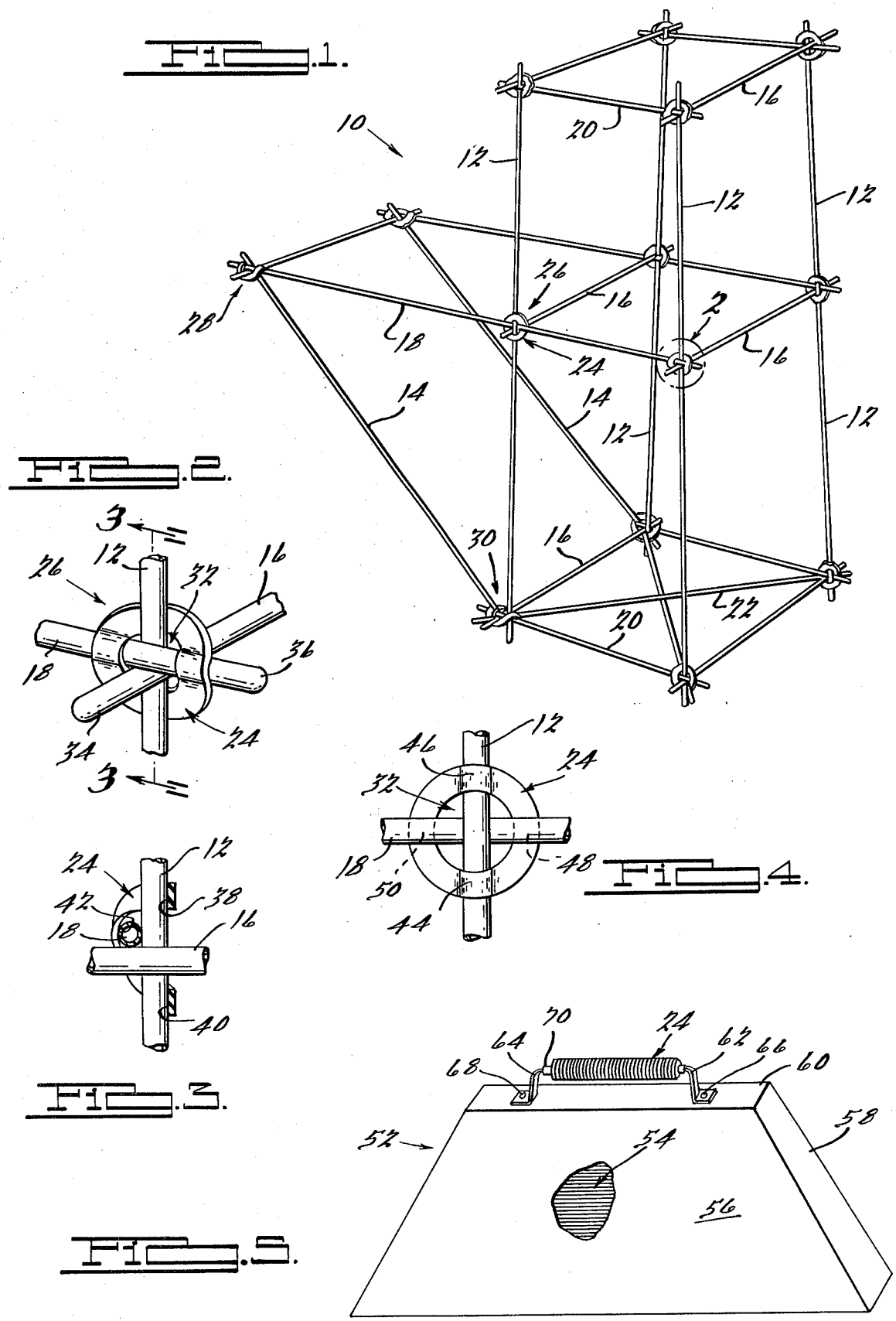

CONSTRUCTION TOY AND CONTAINER

BACKGROUND OF THE INVENTION

The present invention relates to the field of educational construction toy devices and artistic constructions. More particularly, the present invention relates to a toy which can be constructed into a variety of various three-dimensional forms of joining rods together with flexible linking rings.

Toy construction devices having struts and members for joining the struts in interlocking relationship to form a three-dimensional structure are known in the art. For example, U.S. Pat. Nos. 1,281,832, Oct. 15, 1918, to post; and 3,998,003, Dec. 21, 1976, to Rosenbaum teach construction toys wherein a plurality of rods or struts are joined by linking members having sockets for supporting and joining ends of the struts. Another example of a toy construction is shown in U.s. Pat. No. 3,927,489, Dec. 23, 1975, to Bernstein which discloses a construction toy having rod-like channels with connectors on the ends thereof which attach to ring members for joining the rod-like channels together.

It, of course, can be readily appreciated that construction toys which are limited by prescribed angular relationships of joined rods limit the range of forms which can be erected therefrom. Thus, it would be desirable to have a rod or strut construction which employs joining members allowing an infinite number of angular relationships. Of course, it would also be desirable if the construction toy could be economically provided so as to be readily available at a reasonable cost.

Accordingly, it is an object of the present invention to provide a construction toy which can be assembled in a variety of shapes in accordance with the imagination of the builder. Another object of the present invention is to provide a construction toy in which the parts thereof are joinable to each other in an infinite variety of angular relationships. Another object of the present invention is to provide a construction toy which can be economically manufactured to minimize the cost of the construction toy and to promote the use thereof. These and other objects will become apparent from the following disclosure taken in conjunction with the accompanying drawings and claims appended hereto.

BRIEF DESCRIPTION OF THE DRAWINGS

FIG. 1 is a perspective view of selected parts of the present invention joined in one possible structural or decorative form;

FIG. 2 is an enlarged, perspective view of the portion of FIG. 1 indicated by the numeral 2 and showing a typical joint which can be formed in accordance with the present invention;

FIG. 3 is a sectional view taken along line 3—3 in FIG. 2;

FIG. 4 is an enlarged elevational view of another typical joint which can be formed with the construction toy of the present invention; and FIG. 5 is a perspective view showing the present invention in packaged form.

DESCRIPTION OF THE INVENTION

Now referring to the figures, one structural form of a construction toy of the present invention is shown in perspective in FIG. 1 and indicated generally by the numeral 10. In the embodiment of FIG. 1, construction toy 10 comprises a plurality of rods 12, 14, 16, 18, 20, and 22 shown interconnected in a three-dimensional geometric relationship by means of a plurality of connectors 24. As will be readily appreciated, a wide variety of other three-dimensional geometric forms can be constructed by assembling the rods of the present invention in various different selected relationships.

The structure of FIG. 1 includes vertically extending rods 12, rods 14 canted from the vertical and horizontal, horizontally extending rods 16, 18, 20 and 22. Rods 18 and 20 are generally parallel to each other while rods 16 extend at a right angle to adjacent rods 18 or 20 and rods 22 extend diagonally at the base of the structure. In the structure of FIG. 1, rods of four different lengths are employed. It will, of course, be appreciated that rods of various lengths can be employed in the present invention and that in some instances rods of more than four different lengths will be desired while in other instances rods of fewer than four different lengths will be desired. In FIG. 1, rods 12, 14, 16 and 22 are of different lengths. Rods 18 are equal in length to rods 12 and rods 20 are equal in length to rods 16. Adjacent portions of rods are linked or joined together by a plurality of linking rings 24. Each linking ring 24 is of the same size and construction but can be readily adapted to form various different joints. Thus, joint 26 illustrates use of ring 24 to join three rods which have a generally right angular relationship, joint 28 illustrates use of ring 24 to join three rods in a different angular relationship and joint 30 illustrates use of ring 24 to join five rods. It will, of course, be appreciated that many different joints can be made within the broad scope of the present invention, including joints between 2, 3, 4, 5, 6 or even more adjacent rods. It also will be appreciated that joints can be had not only between ends of rods but also between portions intermediate the ends or between a mixture of ends and intermediate portions.

Rods 12, 14, 16, 18, 20, and 22 can be made of extruded plastic, stainless steel, or wood and can be of solid cross-section or tubular, of square, round, or oval cross-sectional shape, or can even be channel-shaped. The rods can be all of one length or of various different selected length. Also, the rods can be stiff or somewhat bendable, so long as sufficient strength is provided to support the desired structure. The rods need not necessarily be straight. It is contemplated that rods having a curved, angled, or other irregular shape can be used in accordance with the present invention as such can be readily joined by means of washers 24. Rings 24 comprise a deformable but resilient material such as rubber, neoprene ®, or other synthetic rubber-like material, and are preferably of a flat, washer-like shape. Alternatively, rings 24 may have a round or other geometrically shaped cross-section. The exact size of rings 24 as well as the diameter of the central aperture therein, of course, depends upon the size and number of rods to be joined thereby.

The nature and use of ring 24 to link or join rods together is further illustrated in FIGS. 2-4. Thus, as is shown in FIGS. 2 and 3 with respect to joint 26, rods 16, 18, and 12 can be joined by an arrangement wherein rod 16 extends through the central hole 32 of ring 24 while rods 12 and 18 are positioned on opposite sides of ring 24 so that ring 24 urges them into engaging relationship. End portions 34 of rod 16 and 36 of rod 18 extend outwardly slightly beyond the ring 24 so that ring 24 does not slip past either end of rods 16 or 18.

Surface portions 38 and 40 of ring 24 exert pressure to the left as viewed in FIG. 3 against rod 12 while surface portion 42 exerts pressure to the right against rod 18. The size of hole 32 is sufficiently small that some compressive force is exerted against rod 16 directly by ring 24 or through one or both of rods 12 and 18 to join rod 16 in linking relationship.

Now referring to FIG. 4, a joint is shown wherein a rod 12 is joined generally at a right angle to a rod 18 by means of a ring 24. As shown in FIG. 4, rod 12 extends on one side of ring 24 such that, as viewed in FIG. 4, portions 46 and 44 of ring 24 lie on top of rod 12. Rod 18 extends on the other side of ring 24 such that portions 48 and 50 of ring 24 lie underneath rod 18. The size and nature of ring 24 is selected so that ring 24 exerts force upwardly against rod 18 and downwardly against rod 12, the resulting compressive and frictional forces securing the rods 12 and 18 in joining relationship.

Joints such as those illustrated as joints 28 and 30 in FIG. 1 as well as variations thereof in which 2, 3, 4, 5, or 6 rods are linked together in various relationships can be readily constructed along the lines disclosed above. Generally speaking, ring 24 is expanded, twisted or bent in a manner calculated, because of the resilient nature of the ring, to exert compressive forces of one rod against another. It will be readily appreciated that the nature of the joining mechanism of the present invention allows an infinite number of different angular relationships between joined rods as well as use of rods of various lengths, different numbers of rods in various joints, different relative positioning of rods in joints, joints located not only at ends of rods but also at locations intermediate rod ends and joints between intermediate and end portions of rods. Hence, the number of different structural forms that can be made by means of the present invention is limited only by the imagination of the builder.

Now referring to FIG. 5, construction toy 10 is shown in a packaged form which is indicated generally by the numeral 52. Package 52 includes an enclosure with trapezoidal shaped opposite sidewalls 56 and end walls 58 (only one of each being shown in the Figure), top wall 60 and bottom wall (not shown in the Figure). A handle comprises a tube 70 through which extends a handle element which has opposite, downwardly extending end portions 62 and 64 which are respectively removably attached to top 60 by fasteners 66 and 68. A multiplicity of rings 24 fit coaxially over the substantial length of tube 70 to provide convenient handle means for storing rings 24 as well as for manipulating or carrying package 52, the interior of which contains rods 54 of the present invention. Rods 54 can include rods 12, 14, 16, 18, 20, and 22, the trapezoidal shape of the enclosure being well adapted to carry longer rods in the bottom portion and shorter length rods in the top portion of package 52.

It will be appreciated that the disclosure herein of the present invention and one structural form thereof has been well calculated to illustrate the inventive concept of the present invention and the advantages thereof. However, it is to be understood that the present invention may be subjected to changes and modifications. For example, additional forms or structural elements such as strips, walls, triangular walls, squares, etc., can be fastened to the rods and adapted for use herewith. Such changes and modifications are intended to be within the scope and spirit of the present invention which is limited as defined in the following claims.

What is claimed is:
1. A construction toy comprising:
 (a) a plurality of rods; and
 (b) a plurality of linking rings, each of said rings being shaped generally like a flat washer and having a centrally disposed aperture therethrough and comprising a resilient bendable material adapted to exert compressive forces against two or more of said rods to link said two or more of said rods in joined relationship to each other;
 (c) a trapezoidal enclosure within which said plurality of rods are constrained; and
 (d) a handle element attached to said enclosure, said plurality of rings being coaxially positioned over said handle element.
2. A construction toy as recited in claim 1 wherein each of said rings is adapted to be weaved about two or more of said rods to exert compressive force thereagainst.
3. A construction toy as recited in claim 2 wherein each of said rings is made of synthetic rubber.
4. A construction toy as recited in claim 3 wherein each of said rods comprises a thermoplastic material.
5. A construction toy as recited in claim 4 wherein each of said rods is a tube.
6. A construction toy as recited in claim 5 wherein said plurality of rods comprising rods having different lengths.
7. The construction toy as recited in claims 3, 4, 5, or 6 wherein said handle element is removably attached to said enclosure.

* * * * *